AUTOMATIC COOLING EFFECT CONTROLLER

Original Filed May 28, 1963

INVENTORS
William W. Parks &
Willard J. Holman
By Lowman A. Witt
Att'y.

United States Patent Office 3,237,861
Patented Mar. 1, 1966

3,237,861
AUTOMATIC COOLING EFFECT CONTROLLER

William W. Parks, Glenview, and Willard J. Holman, Forest Park, Ill., assignors to Vapor Corporation, Chicago, Ill., a corporation of Delaware Original application May 28, 1963, Ser. No. 283,724. Divided and this application Aug. 13, 1964, Ser. No. 394,096
1 Claim. (Cl. 236—13)

Figures 1, 2:
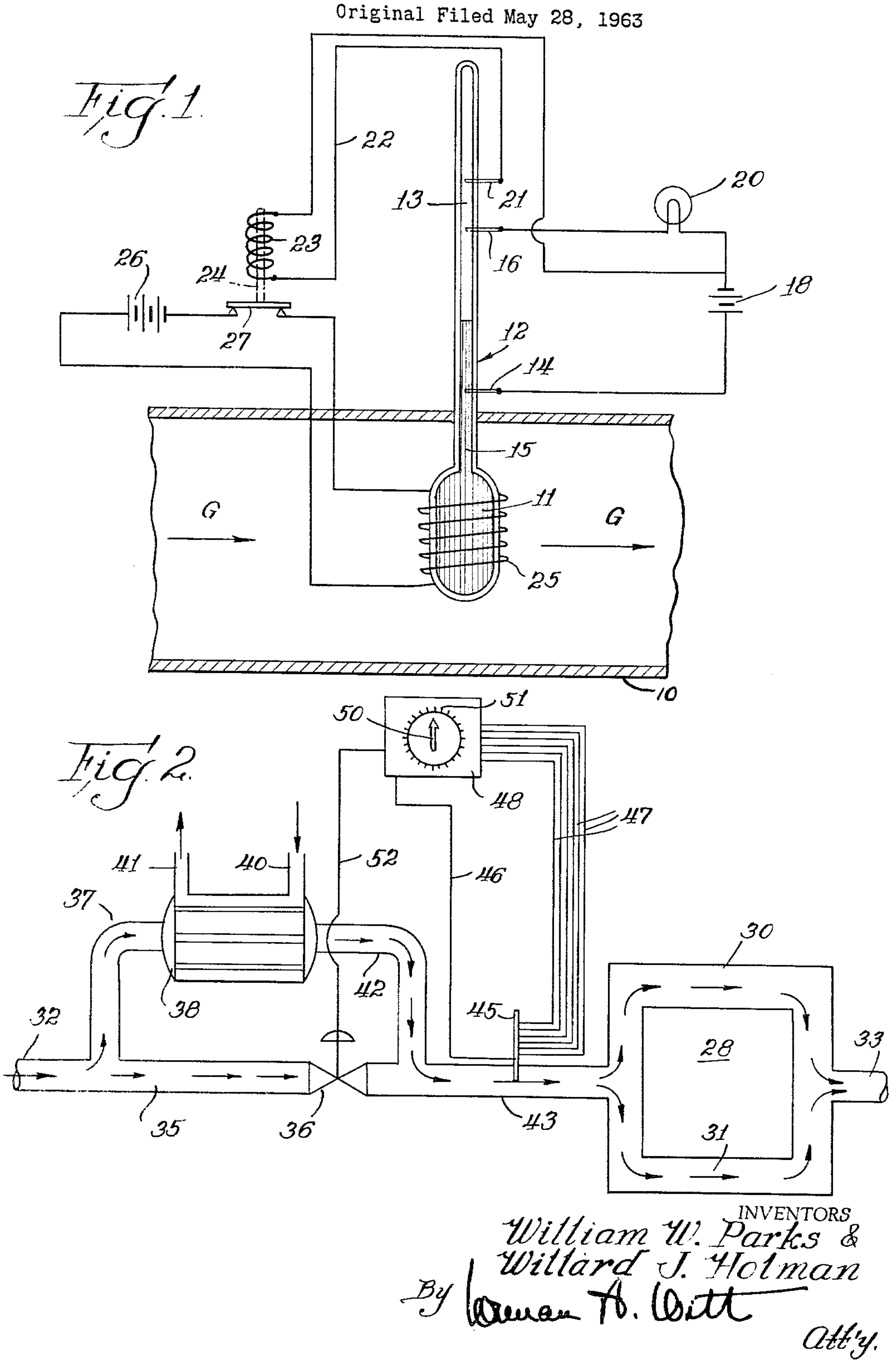

This invention relates to a cooling effect detector means and associated control means. This is a division of our application Serial No. 283,724 filed May 28, 1963.

Many objects or devices are commonly cooled to maintain proper operating temperatures by passing a stream of cooling fluid, such as air, thereover. For example, many electronic devices, such as radios, have a substantially constant heat supply from tubes, resistors, etc. Operation of these devices causes their temperature to rise until an equilibrium operating temperature is reached. The equilibrium operating temperature is the temperature at which heat loss equals heat supply or input, and if the heat loss is solely by radiation effect, the equilibrium temperature may reach damaging levels.

Many such devices are so sensitive to temperature that they must be cooled positively for sustained operation. One convenient mode of cooling is by a blower, which directs cooling air over the equipment. Heat thus is removed by convection and radiation, to maintain the equilibrium temperature substantially lower than if heat were removed solely by radiation effect. The transfer of heat to an air stream, however, is dependent upon many factors, some of which may vary widely. For instance, the temperature difference between the item being cooled and the air stream is quite determinative of the rate at which heat is transferred to the air stream. Generally speaking, the higher the temperature difference, the faster the heat transfer. The mass and velocity of the cooling medium, such as air, passing over the device to be cooled thereby is also very important, not only because a large quantity of air is capable of absorbing more heat, but because increasing the velocity of the air stream decreases the thickness of the insulating film or blanket of still air immediately adjacent the hot object, thereby improving heat transfer to the flowing coolant. Other factors, such as the composition of the cooling medium, its density, humidity, the shape of the passageway for carrying the cooling medium over the object being cooled and other recognized factors also are important considerations to a satisfactory solution of the cooling problem.

The composite of all of these factors is called the cooling effect. If a cooling air stream decreases in flow, its cooling effect will diminish, but if at the same time it decreases in temperature, the cooling effect may be lower, the same, or actually increase over the previous cooling effect. Since the cooling effect is the ability to remove heat from the hot body, it is not measurable with ordinary instruments, such as a thermometer. It is not even measurable through the combined use of a thermometer and a mass flow meter, such as an orifice meter, because both the volume and the velocity of the cooling fluid as well as other factors, must be considered in determining the total cooling effect.

It is an object of this invention to provide an improved device for measuring cooling effect of a fluid coolant.

It is another object of this invention to provide control apparatus which indicates when the cooling effect of the cooling fluid falls below a certain predetermined minimum value.

It is still another object of this invention to provide control apparatus which is capable of indicating the cooling effect of the cooling fluid employed, and which also is capable of changing the cooling effect of the fluid to prevent it from falling below or exceeding certain predetermined limit values.

These objects are accomplished according to the present invention which, in its simplest form, includes means for sensing cooling effect of a fluid stream, including thermostat means having a temperature-sensitive element, such as an encased bulb of mercury in open communication with a capillary tube, and a regulative reference heat source, such as an electrical resistance heater element, capable of adding heat to the temperature sensitive element or body of mercury at a constant selected rate. The distance that the mercury expands into the capillary tube is dependent upon its temperature, which in turn, in the case of a dynamic system where gas is flowing, will depend upon the equilibrium temperature at which heat lost from the body of mercury in the bulb is offset by heat input from the heater. Any change in the condition of the flowing cooling medium affects this heat transfer, and such change is therefore reflected immediately by the cooling effect detector. If the flow rate of gas decreases, a thickened film around the mercury bulb will reduce the heat transfer, so that a greater temperature difference between the flowing stream and the mercury will be required for a given amount of heat to cross the intervening insulating air film. This change of condition will be represented by the mercury rising higher in the capillary tube because of its resulting increased temperature. If the temperature of the cooling fluid is diminished, with all other factors equal, the temperature difference between the mercury in the bulb and the flowing stream will increase, and a greater cooling effect will be indicated by a lowering of the mercury level in the capillary tube.

The instrument of this invention may have two or more electrical contacts extending through the glass wall into the capillary tube, one such contact being always in electrical contact with mercury, and the others being spaced in the open space above the mercury where, under normal operating conditions, such will be out of electrical contact with the mercury. The mercury rising in the tube and serially coming into electrical contact with various of these conductors may initiate desired control means to energize light indicators for signifying a preselected cooling effect limit has been reached, or it may automatically effect adjustment or regulating means for changing the cooling effect of the gas, as will be described hereinafter.

The invention also contemplates a cooling apparatus wherein adjustments are available for changing automatically the cooling effects of a gas stream. Such apparatus includes a source of pressurized fluid, such as air from a compressor, and a conduit means passing the air over the item to be cooled. Typically, the conduit means contains a valve and a conduit branch by-passing the valve. In the by-pass conduit there is means for reducing the temperature of the fluid flowing therethrough. Between the by-pass conduit and the object being cooled there is a cooling effect detector such as described hereinabove. The flow of cooling medium from the source over the object being cooled may be distributed in virtually any proportions between the main conduit and the by-pass conduit by regulating appropriate valve means in the conduit system, such that when the valve means is completely closed, all of the fluid may be directed through the by-pass and be cooled. In its simplest form, the cooling effect sensing detector means will indicate what the cooling effect is, and the operator, by manipulating the valve means, can provide whatever cooling effect is desired by blending proportions of cooled and uncooled air. More complex embodiments include means connecting the detector to electrical circuit means for indicating when a certain minimum cooling effect is obtained, so that an operator is thereby warned that some change in the cooling ability of the gas stream must be made. Additionally, such circuit means respond to the cooling effect detector to control operation of the valve in the main conduit to thereby automatically provide a stream of cooling fluid with the amount of cooling effect required to maintain predetermined operating conditions for the item being cooled.

The accompanying drawings are presented for the purpose of illustrating the features of this invention.

In the drawings:

FIGURE 1 is a sectional schematic view of a cooling effect detector embodying this invention; and FIGURE 2 is a schematic view of a cooling device employing a cooling effect detector, according to this invention.

In FIGURE 1, a conduit means 10 for carrying a cooling medium, such as air, is equipped with a thermostat means, shown as a mercury thermostat having a bulb 11 disposed within the interior of conduit 10. The bulb 11 contains a body of mercury that is in open communication with a capillary tube 12, made of non-conductive material such as glass, which is sealed at its upper end and evacuated in the space 13 above the mercury. Tube 12 extends outwardly of the conduit 10. The capillary tube has an electric conductor 14 extending through and sealed with the wall therof, which is in electrical contact with the mercury column 15 in the tube. The position of conductor 14 is such that under normal operating conditions, it will be in electrical contact with the mercury 15 within the capillary tube. At least one other electrical conductor 16 extends through the capillary tube wall and terminates within the open space 13 above the mercury column 15. Conductors 14 and 16 are mutually connected in circuit with source of electricity 18, and an indicator 20, herein shown as an incandescent lamp. One or more additional conductors may also be employed in a similar manner. For instance, as illustrated in FIGURE 1, an additional conductor 21 is embedded in the wall of the capillary tube to communicate with the capillary space 13; this conductor being in a circuit with conductor 16, source 18, circuit conductor 22 and a coil 23 in magnetic communication with a solenoid core member 24 to form a solenoid operated relay whose function will be described more fully hereinafter.

Bulb 11 is wrapped with several turns of heater wire 25, which is in electrical circuit with souıce 26 of electrical energy for supplying constant voltage whereby heat at a constant rate is supplied to the bulb 11. A switch 27 operatively connected to the solenoid core 24 is in normally closed position to maintain the bulb heater circuit, which includes the source 26 and heating wire 25. In normal operation, the heat source 26 supplies constant voltage current to resistance wire 25 which, in turn, supplies heat at a constant rate to the mercury bulb 11. The flowing gas stream indicated by the arrows G in the conduit 10 constantly removes heat from the mercury bulb 11 so that at some temperature level the heat losses from the mercury bulb are exactly equal to the heat input from the coil 25. At this point, the mercury will stand at a given level in the capillary tube 12, at which level conductor 14 makes contact with the mercury column 15. So long as the cooling effect of the gas stream in the conduit 10 is sufficient to maintain the mercury level between the levels of conductors 14 and 16, the equipment it is ultimately cooling will be maintained at an operating temperature where no damage will be done to it. At some point, due either to a diminished gas flow in the conduit 10 or a rising temperature of the cooling gas, the cooling effect of the gas stream may diminish to a point where the mercury level in tube 12 will rise sufficiently to produce electrical contact with the conductor 16. When this occurs, electrical circuit is established between conductors 14 and 16 by the mercury column 15 so that current from the source 18 may flow through and energize the lamp 20. This occurrence warns the operator that the cooling effect of the gas stream in conduit 10 is insufficient to maintain the equipment being cooled at a low enough level to avoid damage. If for any reason the cooling effect of the stream in conduit 10 is not increased, and a still less cooling effect is experienced, the mercury column 15 will rise in tube 12 sufficiently to produce electrical contact with conductor 21, so that the circuit including the mercury column between conductors 16 and 21, the source 18, the lamp 20 and the solenoid coil 23 is energized. Upon energization of coil 23, the solenoid core 24 is drawn toward the coil, thereby opening the switch 27 and interrupting the heat supply to the bulb 11 from coil 25. The warning signal will stay on, but there will not be sufficient heat flowing to bulb 11 to damage the sensing device itself. It is contemplated that the mercury column will rarely reach the conductor 21 unless the gas flow in the conduit 10 is completely turned off, so that this feature primarily is intended to protect the instrument if the operator forgets to deactivate it when he discontinues the flow of cooling air.

FIGURE 2 illustrates an additional embodiment of this invention wherein the detector device, as above described, is employed in an assembly for regulating the cooling effect of an air stream. The device to be cooled, such as electronic equipment 28 in an airplane, for example, is located so that cooling air may surround it by flowing through passageway means 30 and 31; it being understood that passageway means 30 and 31 may pass through, as well as around, the device 28. Passageway means 30 and 31 are connected to an air supply source 32 at one side and an exhaust 33 at the other. The cooling air from source 32 passes through a conduit 35 containing a control valve 36 which serves to regulate the amount of air passing through the conduit 35. Around the control valve 36 is a by-pass conduit 37, containing within it a cooling means 38, here shown as a sheet and tube heat exchanger, having a conduit 40 for introducing coolant, and a conduit 41 for removing it. Air discharging from the cooling means 38 passes through a conduit 42 and rejoins the air in the main air conduit 35. At that point both streams, that is, the supply stream from conduit 35 and the by-pass stream from conduit 42, merge and mix in conduit 43 before passage into passageway means 30 and 31.

In conduit 43 a mercury cooling effect detector 45 of this invention, as previously described, is placed. A conductor 46 is in electrical contact with the mercury at all operating conditions, and a group of six conductors 47 each occupy a position in the capillary tube more remote from the mercury bulb. Thus, as the mercury rises in the capillary tube the circuit is completed serially through one after another of the conductors 47. An indicating control means 48 receives electrical signals from these serially arranged conductors 47 as each is energized upon contact with the mercury column to indicate by pointer 50 and appropriate units, set out on a cooperating scale means 51, the operational cooling effect of the air stream. By suitable means, such as electrical actuator means of the order shown in United States Patent to Lehane et al. 2,534,174, issued December 12, 1950, indicated generally by 52, or alternately, pneumatic means of the order described in United States Patent to Peterson et al. 2,695,135, issued November 23, 1954, both conventional, the valve 36 is controlled and operated responsively to the detected cooling effect of the air passing through conduit 43. Thus when a diminished cooling effect is detected, valve 36 is closed, or regulated to a more closed position to divert more of the air flow from source 32 through the cooler 38 so that the cooling effect will be increased to a predetermined normal amount. Similarly, if desired, the cooling effect of the air may be diminished by opening valve means 36, diverting more air directly to the device 28 and by-passing the cooler 38. Thus the air stream is regulated to pass through conduits 35 and 37 to cool the device appropriately to maintain the same at a desired equilibrium operating temperature.

It is evident from the foregoing that the device of this invention detects and regulates the cooling effect of the air stream independently of any single factor thereof, such as temperature, flow rate or other previously utilized properties. Especially in aircraft, this is important since the temperature of the air, the mass flow rate, and even the composition, to a minor extent, may change radically from one altitude to another. Through the use of this invention, the property of interest, namely, the ability of the air stream to remove heat, is measured or is employed as a sensing means in a control system for the purpose of removing heat by a gaseous cooling medium.

It is preferred, although not essential, that the conduit 43 have a cross-section area equal to approximately the average combined cross-section area of the channels 30 and 31. This may be accomplished by providing a separate channel for the detector 45, having a cross-section approximately equal to the average cross-section of the channel in communication with the heat transfer areas. The purpose of this is to provide approximately the same velocity of air flow around the cooling effect detector as there is in the areas where cooling is actually being effected. However, regardless of whether these velocities are equal or not, there will always be a proportional relationship between them. The velocity of air around the bulb of the cooling effect detector may also be regulated by adjusting the distance that the detector bulb is positioned from the wall of conduit 43, since the velocity of the stream in the conduit will be higher toward the center of the conduit and lower toward the wall.

While the foregoing description has been made in relation to the embodiments of the present invention illustrated in the accompanying drawings, obviously many variations and modifications of the invention, as hereinabove described, may be made without departing from its inventive scope. It is therefore intended that the present invention include such variations, changes, modifications and substitutions of equivalents as will occur to those familiar with this art, and that this invention be limited only in the respects set out in the following appended claim.

We claim:

Cooling effect control means comprising, first conduit means for confining and carrying a flowing body of cooling fluid, by-pass conduit means communicating with said first conduit means, fluid cooling means in said by-pass conduit means operable for removing heat from fluid flowing therethrough, valve means in said first conduit means for controlling and proportioning the flow of fluid through both said conduit means, additional conduit means communicating with both said first and by-pass conduit means for merging and mixing the effluent fluid therefrom, thermostat means comprising a capillary tube closed at one end and communicating with a mercury containing bulb associated with said additional conduit means in a manner so that said bulb is immersed in said merged fluid; heater means in proximity to said bulb for supplying the latter with predetermined heat energy, means operatively responsive to said mercury for indicating the effective thermal response thereof to the heat supplied thereto by said heater means and the heat removed therefrom by said fluid including electrically energized control circuit means comprising a plurality of electrical conductors extending into the capillary space in said tube at successive spaced positions therealong whereby the same are successively contacted by the mercury at respectively successive levels of the latter in said space, means in circuit with said conductors for selectively positioning said valve means in plural pre-selected positions in response to successive circuit making contact of said mercury with the one of said electrical conductors nearest said bulb and one or more of the other said electrical conductors, and means in said control circuit means operative to deenergize said heater means in response to predetermined maximum thermal response of said mercury whereby the mixture and temperature of said merged fluid is controlled and the cooling effect thereof is automatically maintained between predetermined limits.

References Cited by the Examiner

UNITED STATES PATENTS

| | | | |
|---|---|---|---|
| 1,265,765 | 5/1918 | Ferris | 236—68 |
| 1,820,091 | 8/1931 | Reavis | 236—35.2 |
| 2,064,163 | 12/1936 | Ileman | 236—68 |
| 2,710,724 | 6/1955 | McMahon | 236—13 |
| 2,909,323 | 10/1959 | Cholvin et al. | 236—13 X |
| 2,923,759 | 2/1960 | Swan | 236—68 X |
| 3,142,170 | 7/1964 | Calhoun | 236—68 X |

FOREIGN PATENTS

| | | |
|---|---|---|
| 312,797 | 6/1919 | Germany. |

ALDEN D. STEWART, *Primary Examiner.*